US007006836B2

(12) United States Patent
Yokoyama

(10) Patent No.: US 7,006,836 B2
(45) Date of Patent: Feb. 28, 2006

(54) WIRELESS COMMUNICATION SYSTEM AND WIRELESS DEVICE FOR QUICKLY CONNECTING TO DEVICE PROVIDING DESIRED SERVICE, AND METHOD OF CONTROLLING WIRELESS COMMUNICATION SYSTEM AND WIRELESS DEVICE

(75) Inventor: Hidehiko Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 10/461,474

(22) Filed: Jun. 16, 2003

(65) Prior Publication Data
US 2004/0009769 A1 Jan. 15, 2004

(30) Foreign Application Priority Data
Jul. 9, 2002 (JP) ............................. 2002-199798

(51) Int. Cl.
*H04Q 7/20* (2006.01)
*H04M 3/42* (2006.01)

(52) U.S. Cl. ............................. 455/456.1; 455/414.1; 455/456.3; 455/517

(58) Field of Classification Search ............ 455/41.2, 455/500, 507, 514, 517, 66.1, 456.2, 456.3, 455/422.1
See application file for complete search history.

(56) References Cited

U.S. PATENT DOCUMENTS 6,108,554 A * 8/2000 Kawamoto ............... 455/456.5
6,532,368 B1 * 3/2003 Hild et al. ................ 455/515
6,633,757 B1 * 10/2003 Hermann et al. ........ 455/414.1
6,826,387 B1 * 11/2004 Kammer .................... 455/41.2
6,842,460 B1 * 1/2005 Olkkonen et al. ......... 370/465
2002/0028658 A1 3/2002 Ami et al. ................. 455/41
2002/0086663 A1 * 7/2002 Tang et al. ................. 455/414
2002/0087764 A1 7/2002 Yokoyama ................ 710/104
2003/0036350 A1 * 2/2003 Jonsson et al. .............. 455/41
2003/0081603 A1 * 5/2003 Rune ........................ 370/390
2003/0182421 A1 * 9/2003 Faybishenko et al. ..... 709/224
2004/0003133 A1 * 1/2004 Pradhan et al. ........... 709/318

FOREIGN PATENT DOCUMENTS

| EP | 1 024 628 A1 * | 2/2000 |
| EP | 1 089 499 | 4/2001 |
| JP | 2002-099473 | 4/2002 |
| JP | 2002-149516 | 5/2002 |
| JP | 2002-152212 | 5/2002 |

* cited by examiner

*Primary Examiner*—Binh K. Tieu
(74) *Attorney, Agent, or Firm*—Fitzpatrick, Cella, Harper & Scinto

(57) ABSTRACT

A specific device periodically detects devices existing proximally thereto, and holds a list of information of services provided by the detected devices. Further, as its own device information, the specific device publicizes that the device holds the list of service information relating to the proximate other devices. When the other device is to use a specific service, the device holding the service information list is distinguished, a list of devices among the detected devices which provide the desired service is obtained, and by connecting the other device to a device that is on the list and is within a communication range of the other device, a connection can be made quickly to the device providing the desired service.

8 Claims, 7 Drawing Sheets

FIG. 4

NEARBY ANOTHER DEVICE LIST

| BD-ADDR | CoD | FRIENDLY NAME |
|---|---|---|
| 002F12345678 | 040000 | PRINTER 2 |
| 002F98765432 | 020300 | LANAP 1 |
| 002F01020304 | 820104 | PC 1 |
| 002F15AF3E05 | 040000 | PRINTER 3 |
| 002F87EF5AB1 | 400210 | MODEM 1 |

FIG. 5

SERVICE RECORD LIST

| BD-ADDR | SERVICE RECORD |
|---|---|
| 002F12345678 | PRINTING 2 |
| 002F98765432 | LAN ACCESS |
| 002F01020304 | OBJECT PUSH |
| 002F15AF3E05 | PRINTING 1 |
| 002F87EF5AB1 | DIAL UP NETWORK |

NEARBY ANOTHER DEVICE LIST

| BD-ADDR | CoD | FRIENDLY NAME |
|---|---|---|
| 002F12345676 | 068300 | PRINTER 1 |
| 002F98765432 | 020300 | LANAP 1 |
| 002F15AF3E05 | 040000 | PRINTER 3 |

WIRELESS COMMUNICATION SYSTEM AND WIRELESS DEVICE FOR QUICKLY CONNECTING TO DEVICE PROVIDING DESIRED SERVICE, AND METHOD OF CONTROLLING WIRELESS COMMUNICATION SYSTEM AND WIRELESS DEVICE

BACKGROUND OF THE INVENTION

1. Field of the Invention

The present invention relates to a technique for enabling quick connection to a device providing a desired service.

2. Related Background Art

Conventionally, when performing Bluetooth wireless communication between devices, a device on a side initiating the communication detects another device in its proximity, and inquires a class (CoD: Class of Device) of the other device which was detected. If the inquired class is a class for providing a desired service, a connection is made to the other device, and then it is confirmed whether the desired service is actually provided. Then, if the provision of the desired service was confirmed, a request to use the desired service is sent to the other device, and the desired service is used.

FIG. 8 is a flowchart showing specific operations using the service offered at the connection destination, according to conventional Bluetooth wireless communication.

First, at step S1, in order that a main device detects another Bluetooth device in the proximity, the Bluetooth wireless communication is used to issue an inquiry request. The other Bluetooth device which received the inquiry request sends an inquiry response containing the other device's properties (i.e., its class). Therefore, by receiving the inquiry response, the device(s) present in the proximity can be detected.

At step S2, it is determined whether or not the inquiry response to the inquiry request issued at step S1 was received. In the case where the inquiry response was received, then at step S3, a Bluetooth Device Address (BD_ADDR) enabling unique identification of the Bluetooth device, and the Class of Device (CoD) indicating the class of the Bluetooth device, which are included in the inquiry response, are extracted, and a table containing those information is prepared.

At step S4, it is determined whether or not a predetermined time-out period has elapsed. In a case where it has not elapsed, the processing at step S2 and step S3 is repeated.

In a case where the time-out period has elapsed at step S4, then at step S5, the CoD in a top row of the table prepared at step S3 is obtained, and at step S6, it is determined whether or not the CoD thus obtained is related to the class desired by the main device. In a case where it is not the desired class, then at step S7, it is determined whether or not the end of the table has been reached. If the end has not been reached, then the point referenced on the table advances to the next row, and the procedure returns to the processing at step S5.

At step S6, in a case where it is judged that the CoD is related to the desired class, then at step S8, the BD_ADDR existing in the same line as the CoD on the table is obtained, and a connection is made to the Bluetooth device indicated by the BD_ADDR.

At step S9, the Service Discovery Protocol (SDP) is used, and a service record search command is issued to the connected device. The other device which received the service record search command determines whether or not the other device has the designated service record. If the other device has the designated service record, the service record is returned to the device which issued the service record search command.

At step S10, it is determined whether or not the designated service record was returned. If the designated service record was not returned, then the procedure advances to step S7. At step S10, in a case where the designated service record was returned, then at step S11, the service is used according to information indicated in the service record.

As described above, the conventional Bluetooth device detects the proximate other devices, and can focus on the other device which can provide the desired service from among the detected other devices based on their CoDs. However, in order to confirm whether the above-mentioned other device actually provides the service, it is necessary to actually connect to the other device. Further, in a case where the result of the confirmation indicates that the desired service is not actually provided, it is necessary to reconnect to another device and make another confirmation.

Therefore, until another device which has the desired service is found, it is necessary to connect to a plurality of other devices, obtain the service contents provided by those other devices, and confirm them.

For example, in a case where one wants to make the other device print a document, a connection is made to another device having a CoD indicating a printer. However, printing services exist in many varieties. Thus, printers exist which, depending on the printer, provide only an image printing service and cannot do text printing, or provide single-sided printing but cannot do double-sided printing.

In other words, according to the above-mentioned conventional example, in the case where the Bluetooth wireless communication is used to receive the desired service, there is a problem in that the main device cannot be connected accurately and quickly to the other device which actually provides the desired service.

SUMMARY OF THE INVENTION

An object of the present invention is to improve usability of a device.

Further, another object of the present invention is to enable a quick connection to a device providing a desired service.

Further, another object of the present invention is to enable effective distinction of a device which provides the desired service.

Further, another object of the present invention is to use Bluetooth wireless communication to enable an accurate connection to the device providing the desired service.

Thus, in one aspect the invention is a wireless device comprising publicizing means for revealing property of the wireless device, service information obtaining means for obtaining service information held by a device located in a proximity, and notifying means for notifying another device about service information requested by the other device from among the obtained service information.

In another aspect, the invention is a wireless device comprising recognizing means for recognizing another device located in a proximity, connecting means for connecting the wireless device to devices having a particular function among devices recognized by the recognizing means, obtaining means for obtaining device information about devices providing a desired service among the devices connected to the wireless device by the connecting means, and selecting means for selecting device information of a device existing proximate to the wireless device in the device information obtained by the obtaining means.

In yet another aspect, the invention is a wireless device comprising recognizing means for recognizing a device located in a proximity based on a response to an inquiry request made according to a Bluetooth standard, distinguishing means for distinguishing a service provided by each devices recognized by the recognizing means by using Bluetooth-standard Service Discovery Protocol (SDP), and notifying means for notifying a connected other party of device information of a device having a service designated by the other party based on the distinction by the distinguishing means.

In still another aspect, the invention is a wireless device comprising recognizing means for recognizing properties of devices located in a proximity based on responses to an inquiry request made according to a Bluetooth standard, connecting means for connecting the wireless device to devices having specific property, based on the recognition by the recognizing means, obtaining means for obtaining device information about devices providing a desired service among the devices connected to the wireless device by the connecting means, and selecting means for selecting a device existing proximate to the wireless device in the device information obtained by the obtaining means.

BRIEF DESCRIPTION OF THE DRAWINGS

FIG. 4 is a diagram showing an example of a table of the proximate other devices;

FIG. 5 is a diagram showing an example of a list of service records (service information) held by the proximate other devices;

FIG. 7 is a diagram showing an example of a list of the proximate other devices;

DESCRIPTION OF THE PREFERRED EMBODIMENTS

First Embodiment

In accordance with this embodiment, a specific device sends a Bluetooth-standard inquiry request periodically or when instructed by a user, and detects a response thereto (i.e., an inquiry response), to thereby recognize existence of another device present in the proximity of the main device and recognize a Bluetooth Device Address (BD_ADDR) and a Class of Device (CoD) of the other device. Further, the specific device performs a Service Discovery Protocol (SDP) to the recognized other device and holds a list of service information provided by the other device. Then, as its own device information, the specific device publicizes that the specific holds the service information list relating to the proximate other device(s). Further, in response to a request from another device desiring to use a particular service, the specific device notifies to the other device about the list of devices providing the particular service. The device which received this list selects the other device existing proximate thereto from the above-mentioned list, thereby enabling the use of the desired service.

Figure 1:
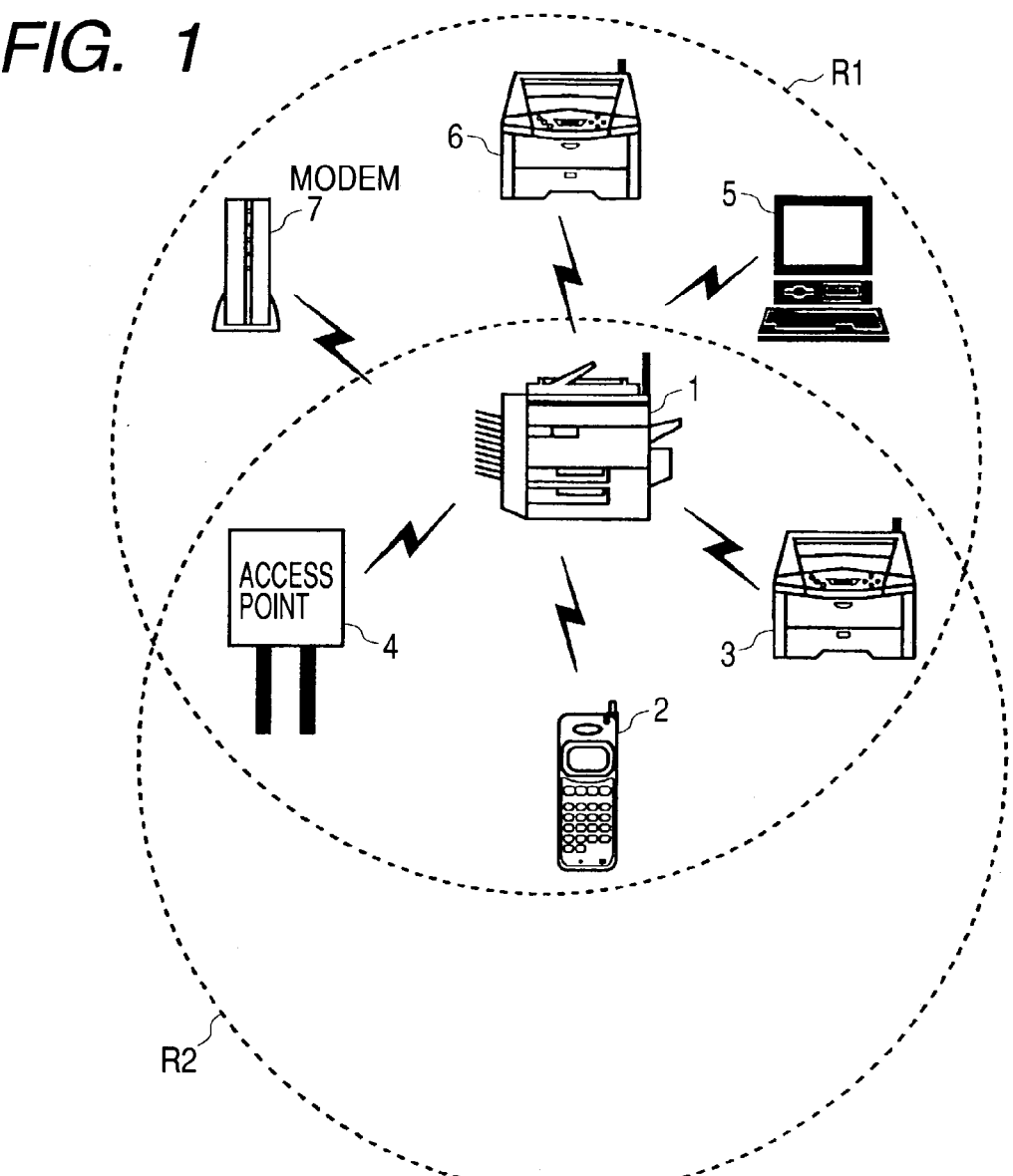
FIG. 1 is a diagram showing a multi-function device (a main device) 1, and other devices present in its proximity, which constitute an embodiment of the present invention.

FIG. 1 is a diagram showing a multi-function printer 1 other devices existing around its periphery, constitute an example of the present invention.

The multi-function printer (MFP) 1 has a Bluetooth wireless communication function, and Bluetooth wireless communication is possible with a cellphone 2, a laser beam printer (LBP) 3, a LAN access point 4, a PC 5, an LBP 6, and a modem 7, which are present within an effective radio range R1.

Note that, the cellphone 2, the LBP 3, the LAN access point 4, the PC 5, the LBP 6, and the modem 7 are examples of Bluetooth wireless communication devices, serving particularly as examples of the other devices.

Further, the multi-function printer 1, the LBP 3, and the LAN access point 4 are present within a valid radio range R2 of the cellphone 2.

Figure 2:
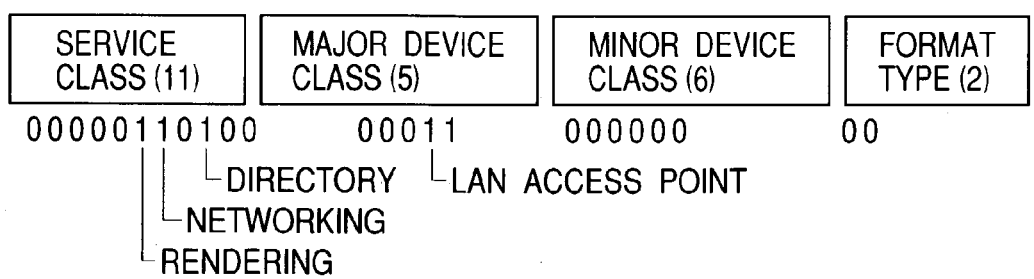
FIG. 2 is a diagram showing a data structure of a CoD showing properties of a Bluetooth device.

FIG. 2 is a diagram showing a data structure of the CoD, which indicates the properties of the Bluetooth devices.

The data structure of the CoD is 24-bit data, constituted by an 11-bit Service Class indicating a general type of the service provided by the Bluetooth device, a 5-bit Major Device Class indicating a general class type of the Bluetooth device, a 6-bit Minor Device class showing a detailed class type for each Major Device Class, and a 2-bit Format Type showing a data format of the CoD itself.

In the CoD shown in FIG. 2, the 9th bit from the left in the Service Class indicates provision of service information (a directory service) to other devices, which achieves this embodiment. The 6th bit indicates a rendering service, which refers to the printer and the like. The 7th bit indicates a network service for providing a connection to the LAN and the like. As for the class type, the 4th bit and the 5th bit from the left in the Major Device Class are each 1, which indicates the LAN access point.

Figure 3:
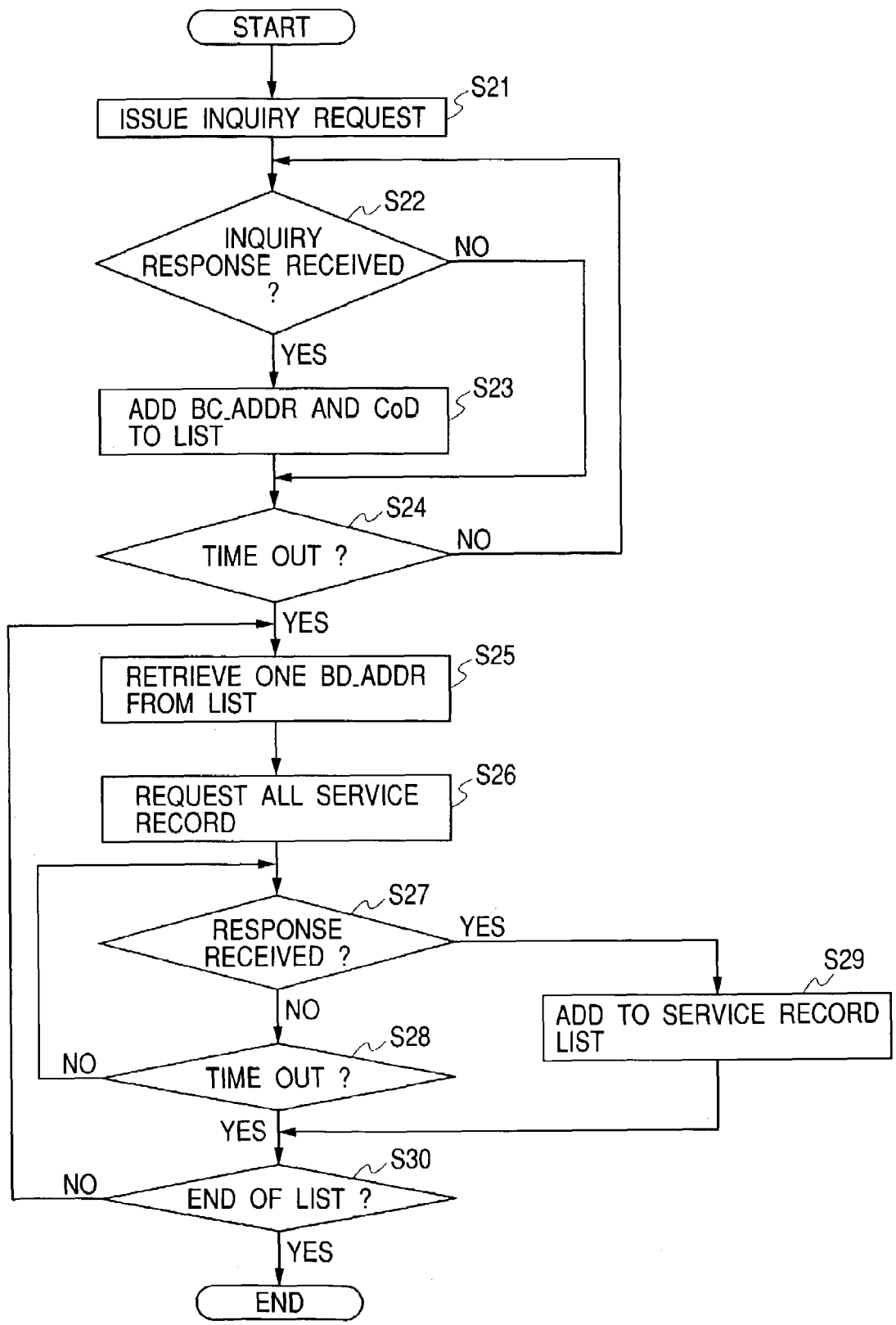
FIG. 3 is a flowchart showing operations in which a Bluetooth device providing a directory service obtains service records of the proximate Bluetooth devices.

FIG. 3 is a flowchart showing operations for obtaining the service records of the proximate Bluetooth devices, in the case of the Bluetooth device providing the directory service.

In the following explanation, in the wireless device construction shown in FIG. 1, it is assumed that the multi-function printer 1 is the Bluetooth device which provides the directory service.

At step S21, the multi-function printer 1 issues the inquiry request, and at step S22, it is determined whether or not the response to the inquiry request (the inquiry response) was received. In the case where the response was received at step S22, then at step S23, the BD_ADDR and the CoD included in the response are added to a table of proximate other devices held in a memory (not shown) of the multi-function printer 1. Note that, it goes without saying that in a case where the table of the proximate other devices is not held in the memory, a new one is prepared.

In the case where the response was not received at step S22, and after executing processing at step S23, then at step S24, it is determined whether or not a predetermined time-out period has elapsed. If the time-out period has not elapsed, then step S22 is processed.

Here, FIG. 4 is an example of the table of proximate other devices held by the multi-function printer 1. In the table of proximate other devices, in addition to the BD_ADDR and the CoD, a Friendly Name which is arbitrarily set for each device by a user is also held in correspondence with the BD_ADDR.

At step S24 shown in FIG. 3, if the time-out period has elapsed, the processing advances to step S25, and at this stage, the table of proximate other devices as shown in FIG. 4 is complete.

At step S25, in sequence from the top of the table of proximate other devices, the BD_ADDR of each device is obtained one by one, and a connection is made to the device which is indicated by the obtained address.

At step S26, the SDP is used to make a request to the above-mentioned connected device that all service records held in that device be returned. At step S27, it is determined whether or not a response was received for the request for all service records held in the other device. If the response has not been received, then at step S28, it is determined whether or not the time-out period has elapsed. If the time-out period has not elapsed, the procedure returns to the processing at step S27.

In a case where the response has been received at step S27, then at step S29, a pair of the BD_ADDR and the received service record are added to a service record table held in the memory (not shown). In a case where the time-out period has elapsed at step S28, or when the addition to the service record table (step S29) is completed, then at step S30, it is determined whether or not the end of the above-mentioned table of proximate other devices has been reached. If the end has not been reached, then the procedure returns to step S25, and the BD_ADDR of the next device on the table of proximate other devices is obtained, thereby making a connection thereto. If the end of the table has been reached, then the processing ends and the service record list held in the other device shown in FIG. 5 is complete.

FIG. 5 shows an example of a list of the service records (the service information) held in the proximate other devices, which was compiled by executing the SDP.

Note that, the processing for obtaining the service records of the proximate other devices, which is shown in the flowchart in FIG. 3, is executed periodically at arbitrarily determined time intervals, or as needed when an instruction is received through a user interface or the like.

Next, in this embodiment, explanation is made regarding an operation for using a printing service called printing service 1 (Printing 1) from the cellphone 2.

Figure 6:
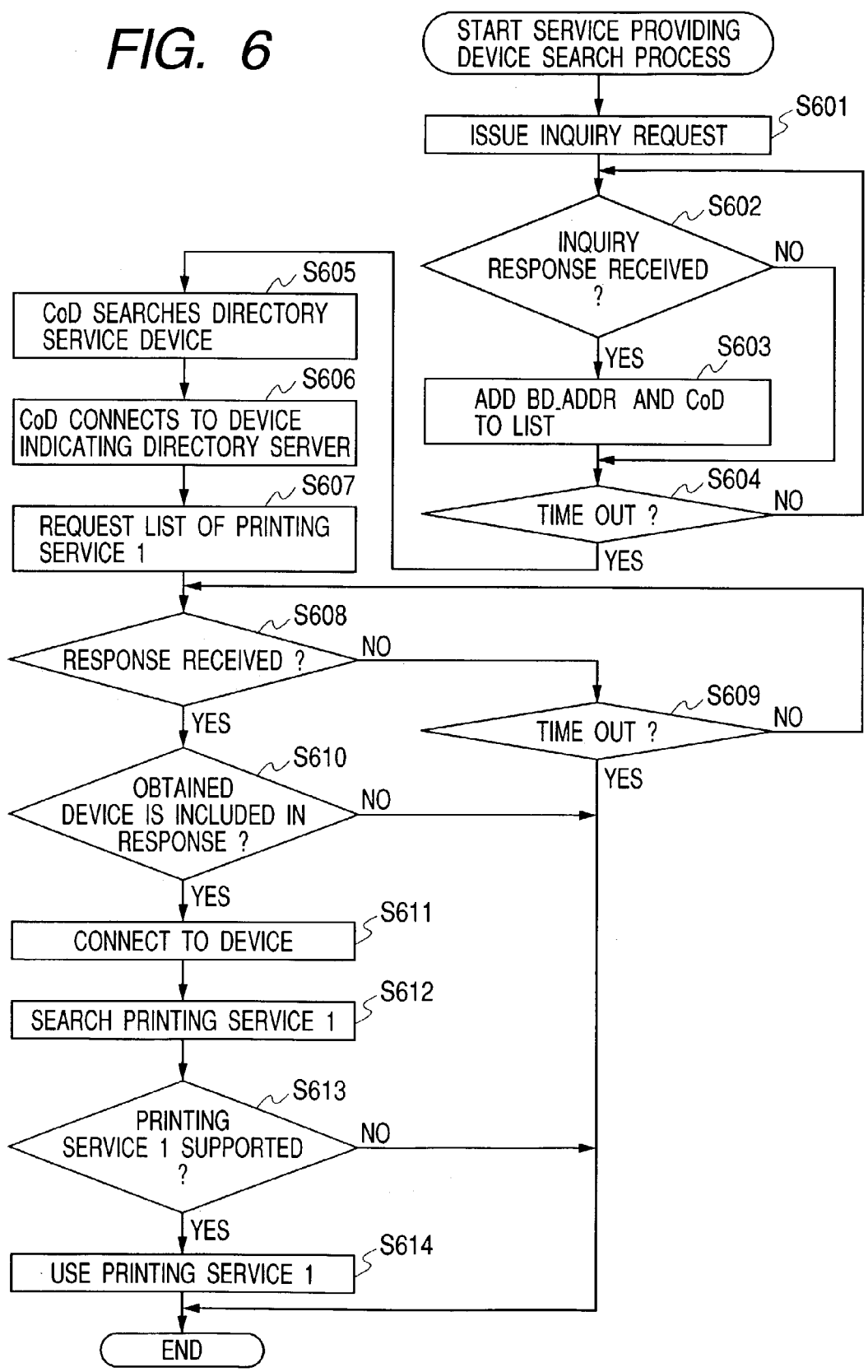
FIG. 6 is a flowchart showing operations for using a printing service called printing service 1 from a cellphone 2.

FIG. 6 is a flowchart of operations for using the printing service called printing service 1 from the cellphone 2, in accordance with this embodiment.

First, the cellphone 2 issues the inquiry request at step S601, and at step S602, it is determined whether or not a response (inquiry response) to the inquiry request was received. In a case where the response was received at step S602, then at step S603, the BD_ADDR and the CoD included in the response are added to the table of proximate other devices being held in the memory (not shown). Further, in the case where the response was not received at step S602, and after executing the processing of step S603, then at step S604, it is determined whether or not the predetermined time-out period has elapsed. If the time-out period has not elapsed, then step S602 is processed.

FIG. 7 is a diagram showing a list of proximate other devices, which was prepared by the cellphone 2 executing steps S601 to 604, in accordance with this embodiment.

Next, at step S605, another device having the directory bit of the CoD (9th from the left) set as shown in FIG. 2 is searched in the list of proximate other devices. At step S606, a connection is made to the retrieved device.

In the list of proximate other devices shown in FIG. 7, the device having the Friendly Name of "Printer 1" (the multi-function printer 1 in FIG. 1) 701 is the device providing the directory service.

At step S607, in a case where the desired service is, for example, the printing service 1, a list request for the printing service 1 is sent to the connected other device (the multi-function printer 1).

At step S608, it is determined whether or not the response to the request at step S607 was received. If the response has not been received, then at step S609, it is determined whether or not the predetermined time-out period has elapsed. If the time-out period has not elapsed, then at step S608, the presence/absence of the response receiving processing is judged.

At step S609, in a case where the time-out period has elapsed, a valid response was not returned from the multi-function printer 1 to which the request was made. Therefore, the processing is ended, and the processing shown in FIG. 8 that was explained using the conventional example is performed. That is, a connection is made sequentially to each device in the table of proximate other devices shown in FIG. 7, and the SDP is used to confirm whether each device provides the printing service 1.

Figure 8:
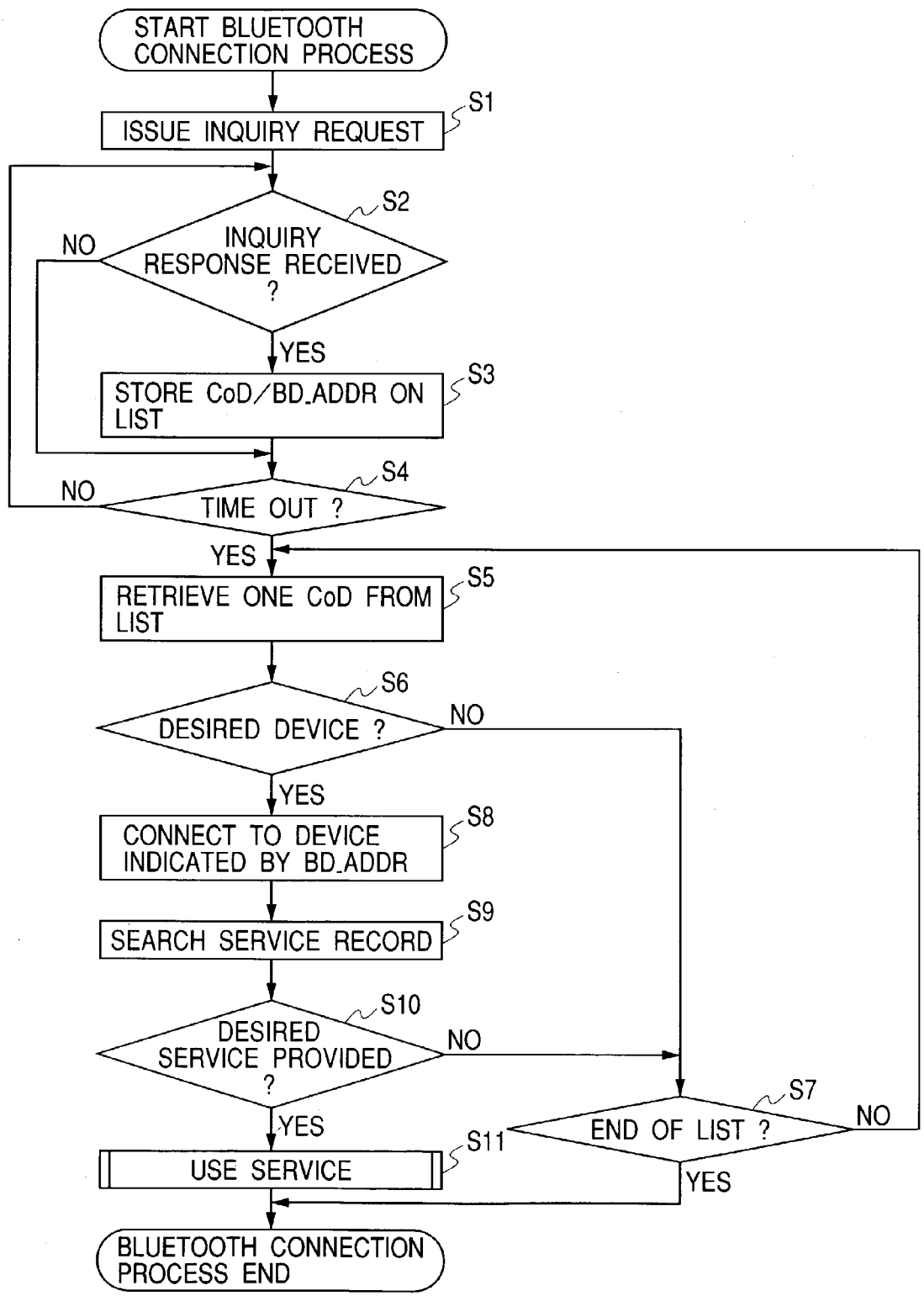
FIG. 8 is a flowchart showing specific operations for using the service offered at the connection destination, according to conventional Bluetooth wireless communication.

At step S608, if the response was received, then at step S610, it is determined whether or not the proximate other devices from which the responses were received in advance at steps S601 to step S604 are included in the list that was received as the response, based on the list of proximate other devices shown in FIG. 7. In a case where the device in the list of proximate other devices in FIG. 7 is not included in the list received as the response, this indicates that the device for providing the desired service is not present in the proximity. In that case, the processing ends, and as shown in FIG. 8, the connections are made in sequence to each device on the list of proximate other devices shown in FIG. 7, and the SDP is used to confirm whether each device provides the printing service 1. This is because the device providing the directory service is outside the communication range, but a device for providing the desired service (the printing service 1 in this example) may be present within the communication range of the cellphone 2.

In a case where the other device providing the desired service was detected at step S610, at step S611, the BD_ADDR included in the response received at step S608 is used to connect to the above-mentioned proximate other device that was detected.

Note that, in a case where a list of the BD_ADDRs of the devices having the desired service (the printing service 1 in the above-mentioned explanation) was received at step S608, then at step S610, it is judged whether there is a BD_ADDR which is included in both the list of the proximate other devices and the received list.

In accordance with this embodiment, by means of the processing shown in the flowchart in FIG. 3, "002F15AF3E05," which is the printing service 1 (or 501) in the service record (i.e., service information) list (shown in FIG. 5), which was produced by the multi-function printer 1 and is held by the proximate other devices, is received at step S608 as the BD_ADDR. This BD_ADDR is included in the list of proximate other devices shown in FIG. 7, which is held in the cellphone 2 (reference numeral 702 in FIG. 7). Therefore, the cellphone 2 is connected to this device. Note that, in accordance with this embodiment, in response to the request at step S607, at step S608, in a case where only 1

BD_ADDR is received but a plurality of devices provide the requested service, an equal number of BD_ADDRs are received.

Next, at step S612, in order to search whether or not the devices connected at step S611 provide the desired service (in this case, the printing service 1), the SDP is used to issue a service record search request.

The service record search request, depending on the settings and the like of each device, may temporarily be in a state such that it cannot provide the service. Therefore, when the service is to be used, the procedure is executed to confirm whether or not the desired service is usable. However, the service record search request is not necessary.

At step S613, if the result of the search at step S612 indicates that the desired service has not been provided, the processing ends, and, as shown in FIG. 8, the connections are made sequentially to each device on the list of proximate other devices shown in FIG. 7, and the SDP is used to confirm whether each device provides the printing service 1. Further, if the result of the search at step S612 indicates that the desired service has been provided, then at step S614, the usage of the desired printing service 1 is requested, and if it is approved the service is used.

Figure 9:
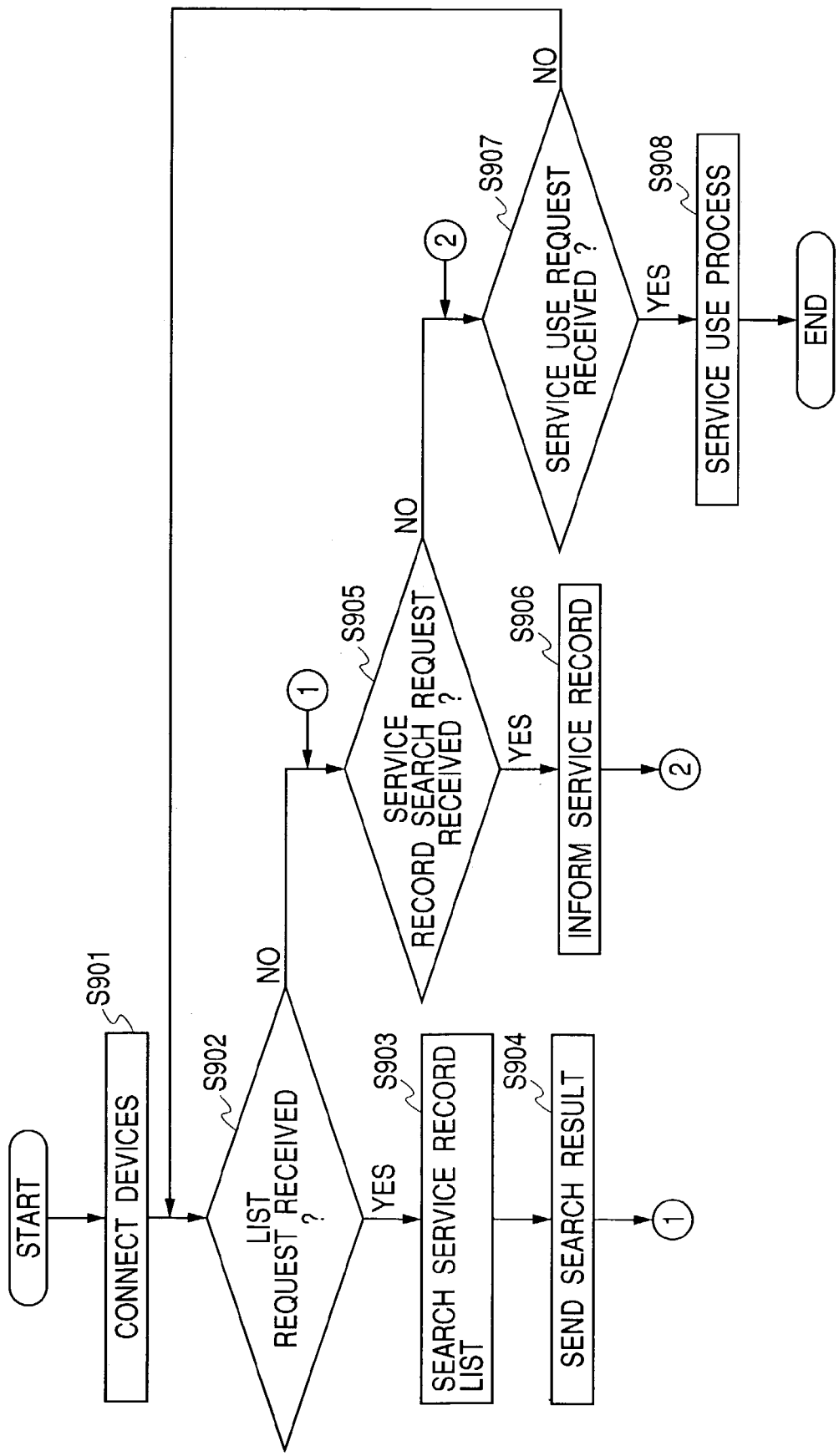
FIG. 9 is a flowchart showing operations in which the Bluetooth device providing a directory service is connected to the other device after obtaining the service record.

Next, in accordance with this embodiment, FIG. 9 is used to explain operations in a case where the device for providing the directory service (the multi-function printer 1) performs the processing shown in FIG. 3 to obtain the service records of the proximate other devices, and after that, receives a connection request from another device.

At step S901, the following discrimination is performed. That is, the connection request from the other device is received, a connection is made to the other device, at steps S902, S905, and S907, a distinction of whether the connected other device received the desired list of service records is performed (in this embodiment, it is distinguished whether the printing service 1 list request sent by the cellphone 2 at step S607 in FIG. 6 was received). Further, it is distinguished whether the SDP service record search request was received (in this embodiment, at step S611 in FIG. 6, in the case where the reconnected partner is the multi-function printer 1 itself which provides the directory service, it is distinguished whether the service record search request sent by the cellphone 2 at step S612 to confirm the provision of the printing service 1 was received). Further, a distinction of whether the usage request for the provided service was received (in this embodiment, a distinction of whether the service usage request sent at step S614 in FIG. 6 was received) is performed.

At step S902, if the list request was received, then at step S903, the service record list (FIG. 5) held in the memory (not shown) is searched, and at step S904, as a result of search request, a list of the BD_ADDRs of the devices having the service records requested from the other device is sent, and the procedure advances to step S905. Note that, in a case where the main device also provides the service for which the list was requested, its own BD_ADDR is also included in the list and is sent.

Further, if the SDP service record search request was received at step S905, the records of the services which can be currently provided by the device itself are notified, and the procedure advances to step S907.

Further, at step S907, the service usage request is received, and in a case where the other party is allowed to use the requested service, a usage approval response is returned, and the other party performs processing to use the service.

In this embodiment as described above, using the Bluetooth wireless communication, a specific device detects proximate other devices, and collects records of services provided by each device. Accordingly, when the specified device receives a request to search other devices providing the particular service from a device trying to use a particular service, the specified device extracts the device providing the designated service from among the collected service records, and by returning the BD_ADDR of the extracted device, the device which requested the search can be quickly connected to the device providing the desired service.

Embodiment 2

According to Embodiment 1, a single multi-function printer collects the service records of the proximate other devices, and provides the directory service. However, in Embodiment 2, a plurality of devices provide the directory service. In this case, in order that devices providing the directory service do not notify each other, as their own service records, of the service records of other devices which are not actually provided by the directory-service-providing devices themselves, the directory-service-providing devices do not perform the Bluetooth communication with each other. Moreover, in order that all the devices trying to use the directory service can use the directory service across a wide area, it is desirable to set the Bluetooth wireless communication effective ranges of the respective directory-service-providing devices such that they intersect with each other.

In accordance with Embodiment 2, a plurality of the Bluetooth devices collect the service records of the other devices present in the effective range of the Bluetooth wireless communication of each device, and in response to the service record search, the information of the other devices having the designated service record is returned, so that the directory service can be provided across the wide area.

Note that, in the above-mentioned embodiment, the multi-function printer (MFP) 1 is an example of the main device, and the cellphone 2, the LBP 3, the LAN access point 4, the PC 5, the LBP 6, and the modem 7 are examples of the other devices.

In other words, the above-mentioned embodiment is an example of a wireless communication device performing the Bluetooth wireless communication with the other device(s) including:

wireless communication means for performing wireless communications with the proximate above-mentioned other devices;

self device property responding means for returning the property of the wireless communication device in response to detection requests from the proximate other devices which performed the above-mentioned wireless communication;

other-device detecting means for detecting the proximate other devices;

service information obtaining means for obtaining service information which is held by the above-mentioned other-device detecting means, and which is held by the above-mentioned other device; and search means for searching in the above-mentioned obtained service information for the other device having the service information containing the service desired by the request source, and returning to the request source the other device searched as mentioned above.

Further, the above-mentioned embodiment offers an example of a wireless communication device having:

wireless communication means for communicating with the proximate other devices;

other-device detecting means for detecting the proximate other devices;

connecting means for connecting the wireless communication with the other device equipped with the specified function, from among the proximate other devices detected by the above-mentioned other-device detecting means;

service information obtaining means for obtaining service information regarding provision of the desired service, from the other devices connected by the above-mentioned connection means; and selection means for selecting the other device which is proximate to itself from among the other devices corresponding to the service information obtained by the above-mentioned service information obtaining means.

According to the present invention as described above, in the case where the Bluetooth wireless communication is used to receive provision of the desired service, the connection is made to the device providing the directory service, the list of devices providing the desired service existing proximally to the device providing the directory service is obtained, the device existing proximally to the self device is selected from the list, and thus the desired service can be used. Consequently, among the proximate other devices, those which are able to provide the desired service are sequentially connected to, so that compared to the conventional example in which the confirmation of provision of the desired service was actually performed with respect to each device, the device actually providing the desired service can be connected to more accurately and more quickly.

What is claimed is:

1. A wireless apparatus comprising:
    a search device that searches for one or more other wireless apparatuses which are capable of communicating with the wireless apparatus;
    a distinguishing device that distinguishes a first wireless apparatus having a predetermined function from among other apparatuses which are capable of communicating with said first wireless apparatus in accordance with a search result by said search device, wherein said predetermined function is a function of notifying a second wireless apparatus which is capable of communicating with said first wireless apparatus and which provides a predetermined service designated by said wireless apparatus;
    a request device that requests said first wireless apparatus to notify said second wireless apparatus which provides the predetermined service; and
    a discrimination device that discriminates said second wireless apparatus which is capable of communicating with said wireless apparatus and which provides the predetermined service, in accordance with the search result by said search device and a response from said first wireless apparatus in response to said request device.

2. A wireless apparatus according to claim 1, wherein said search device searches the other wireless apparatuses for apparatuses which are capable of directly and wirelessly communicating with said wireless apparatus.

3. A wireless apparatus according to claim 1, further comprising a confirmation device that confirms to said second wireless apparatus that the predetermined service is available.

4. A wireless apparatus according to claim 3, further comprising a use request device that requests use of the predetermined service in accordance with the confirmation result by said confirmation device.

5. A wireless apparatus according to claim 1, further comprising a service search that searches for said second wireless apparatus which provides with the predetermined service, among the other apparatuses searched by said search device.

6. A wireless apparatus according to claim 1, wherein said service search device searches for said second wireless apparatus which provides the predetermined service, among the other apparatuses searched by said search device, in a case where any response from said first wireless apparatus is not received in response to the request by said request device.

7. A wireless apparatus according to claim 1, wherein said service search device searches for said second wireless apparatus which provides the predetermined service, among the other apparatuses searched by said search device, in a case where said second wireless apparatus notified from said first wireless apparatus in response to the request by said request device is not included in the other wireless apparatuses searched by said search device.

8. A method of controlling a wireless apparatus, comprising the steps of:
    searching for one or more other wireless apparatuses which are capable of communicating with said wireless apparatus;
    distinguishing a first wireless apparatus having a predetermined function from among other apparatuses which are capable of communicating with said first wireless apparatus in accordance with a search result by said search step, wherein said predetermined function is a function of notifying a second wireless apparatus which is capable of communicating with said first wireless apparatus and which provides a predetermined service designated by said wireless apparatus;
    requesting said first wireless apparatus to notify said second wireless apparatus which provides the predetermined service; and
    discriminating said second wireless apparatus which is capable of communicating with said wireless apparatus and which provides the predetermined service, in accordance with the search result by said search step and a response from said first wireless apparatus in response to said request step.

* * * * *

UNITED STATES PATENT AND TRADEMARK OFFICE
CERTIFICATE OF CORRECTION

PATENT NO. : 7,006,836 B2
APPLICATION NO. : 10/461474
DATED : February 28, 2006
INVENTOR(S) : Hidehiko Yokoyama Page 1 of 1

It is certified that error appears in the above-identified patent and that said Letters Patent is hereby corrected as shown below:

<u>COLUMN 10</u>
        Line 12, after "search", insert --device--;
        Line 13, "provides" should read --is provided--;
        Line 14, "service" should read --service, from--;
        Line 16, "claim 1" should read --claim 5--;
        Line 18, "provides" should read --is provided with--;
        Line 23, "claim 1" should read --claim 5--; and
        Line 25, "provides" should read --is provided with--.

Signed and Sealed this

Sixteenth Day of October, 2007

JON W. DUDAS
*Director of the United States Patent and Trademark Office*